(12) United States Patent
Lund

(10) Patent No.: US 8,125,904 B2
(45) Date of Patent: Feb. 28, 2012

(54) METHOD AND SYSTEM FOR ADAPTIVE QUEUE AND BUFFER CONTROL BASED ON MONITORING AND ACTIVE CONGESTION AVOIDANCE IN A PACKET NETWORK SWITCH

(75) Inventor: Martin Lund, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 622 days.

(21) Appl. No.: 11/443,382

(22) Filed: May 30, 2006

(65) Prior Publication Data

US 2007/0280111 A1   Dec. 6, 2007

(51) Int. Cl.
*H04J 3/14* (2006.01)
*H04J 1/16* (2006.01)
*H04L 12/26* (2006.01)
*H04L 1/00* (2006.01)
*H04L 12/28* (2006.01)
*H04L 12/16* (2006.01)

(52) U.S. Cl. ......... 370/231; 370/232; 370/235; 370/236

(58) Field of Classification Search .................. 370/229, 370/230, 230.1, 231, 232, 233, 234, 235, 370/235.1, 236, 236.1
See application file for complete search history.

(56) References Cited

U.S. PATENT DOCUMENTS

| | | | |
|---|---|---|---|
| 5,289,470 A * | 2/1994 | Chang et al. .................. 711/173 |
| 6,252,851 B1 * | 6/2001 | Siu et al. ........................ 370/236 |
| 6,438,101 B1 * | 8/2002 | Kalampoukas et al. ...... 370/229 |
| 6,643,256 B1 * | 11/2003 | Shimojo et al. ............... 370/229 |
| 6,757,248 B1 * | 6/2004 | Li et al. .......................... 370/235 |
| 6,901,593 B2 * | 5/2005 | Aweya et al. .................. 718/104 |
| 6,925,060 B2 * | 8/2005 | Mangin .......................... 370/237 |
| 7,047,312 B1 * | 5/2006 | Aweya et al. .................. 709/235 |
| 2007/0280106 A1 | 12/2007 | Lund |
| 2007/0280238 A1 | 12/2007 | Lund |
| 2007/0280239 A1 | 12/2007 | Lund |
| 2007/0280277 A1 | 12/2007 | Lund |

OTHER PUBLICATIONS

Arpaci, "An Adaptive Queue Management Method for Congestion Avoidance in TCP/IP Networks", 2000, IEEE, all pages.*
Semke, Automatic TCP Buffer Tuning, 1998, ACM, all pages.*

* cited by examiner

*Primary Examiner* — Kwang B Yao
*Assistant Examiner* — Adam Duda
(74) *Attorney, Agent, or Firm* — Thomas, Kayden, Horstemeyer & Risley, LLP.

(57) ABSTRACT

Certain aspects of a method and system for an adaptive queue and buffer control based on monitoring and active congestion avoidance in a packet network switch are provided. When memory from a memory source is not available for allocation to one or more adaptive queues in a network device, such as a network switch, the TCP window size associated with the one ore more adaptive queues may be reduced. The window size may be reduced to a target size by utilizing one or more reduction steps, wherein the reduction steps may be programmable. When portions of the memory source become available for allocation to the adaptive queues, the window size may be increased. The window size may be increased to a target size by utilizing one or more increase steps, wherein the increase steps may be programmable.

24 Claims, 14 Drawing Sheets

METHOD AND SYSTEM FOR ADAPTIVE QUEUE AND BUFFER CONTROL BASED ON MONITORING AND ACTIVE CONGESTION AVOIDANCE IN A PACKET NETWORK SWITCH

CROSS-REFERENCE TO RELATED APPLICATIONS/INCORPORATION BY REFERENCE

This application makes reference to:
U.S. application Ser. No. 11/442,745 filed on May 30, 2006;
U.S. application Ser. No. 11/442,850 filed on May 30, 2006;
U.S. application Ser. No. 11/442,801 filed on May 30, 2006; and
U.S. application Ser. No. 11/442,928 filed on May 30, 2006.

Each of the above stated applications is hereby incorporated by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to processing of signals in networking systems. More specifically, certain embodiments of the invention relate to a method and system for an adaptive queue and buffer control based on monitoring and active congestion avoidance in a packet network switch.

BACKGROUND OF THE INVENTION

In a telecommunications network, a switch is a device that channels incoming data from any of a plurality of input ports to at least one output port that will communicate the data toward its intended destination. In the traditional circuit-switched telephone network, one or more switches are used to set up a dedicated temporary connection or circuit for an exchange between two or more parties. On an Ethernet local area network (LAN), a switch determines which output port to forward a particular packet frame based on the medium access control (MAC) address of the received packet frame. In a packet switched Internet protocol (IP) network, a switch may determine which output port to use to route the network packet based on the IP address of each packet.

Various software algorithms and applications have been developed to discover the topology of a network and detect the presence of loops in a network. Whenever a loop is detected, the traffic on those ports that form the loop may be blocked. A blocked port may not be used to forward traffic since it would result in the forwarded traffic being looped back and subsequently received at the output port from which it was communicated. Standardized protocols such as spanning tree and rapid spanning tree are utilized to detect and prevent occurrences of loops within a network. Such methods for detecting and preventing loops may be referred to as active methods.

A loop generally creates a high concentration of traffic, which excludes other applications from communicating data over the input and output ports that form the loop. If a sufficient amount of switch ports are placed in a loop, this may render the switch inoperable. This may occur in instances where traffic in a loop is also being broadcasted to other ports and may reduce those portions of a network that is served solely by the switch.

Quality of Service (QoS) is an IP concept and uses tools and protocols that are designed to aid the provision of defined predictable data transfer characteristics. Quality of Service is also relevant at layer 2 within the Ethernet environment and also within the WAN technologies such as Frame Relay and ATM. The drive for QoS has become very strong in recent years because there has been a growth of multimedia traffic such as voice and video, which mixes it with more traditional data traffic such as file transfer protocol (FTP), Telnet and server message block (SMB). Applications such as Voice over IP (VoIP) and various conferencing applications, for example, Microsoft's Netmeeting, have opened up the possibility of more interactive communications between users not just over a LAN but also over a WAN.

While data traffic such as text may be tolerant of delays and dropped packets, voice traffic is very sensitive to and therefore, very intolerant of delays. Video is also intolerant of jitter and packet loss, plus it has the added complication of being very bursty at times. This convergence of multimedia traffic with traditional data traffic is set to grow and therefore requires methods and tools to ensure that providers may deliver networks that give the users confidence to use these tools effectively.

There may be a plurality of problems associated with providing a QoS for a network, for example, there may be a shortage of bandwidth because network links are oversubscribed. The packets may be lost due to congestion at bursty periods. There may be an end-to-end delay comprising for example, a fixed switch delay as packets are layer 2 switched from the call initiator, a fixed encoding delay, a fixed voice activity detection (VAD) around 5 ms, a fixed packetization delay, a variable output queuing delay as voice packets enter an output queue and wait for the preceding frame to be played out, and a fixed serialization delay for the time it takes to get the bits on to the circuit. The end-to-end delay may also comprise a fixed processing delay for the time it takes for the packets to be examined, routed, and managed, a variable network queuing delay due to clocking frames in and out of the different network switches, a fixed network propagation delay as the packets traverse the medium, a variable input queuing delay as voice packets enter an input queue and wait for the preceding frame to be played out, a fixed dejitter buffer delay, a fixed switch delay as packets are layer 2 switched to the endpoint, a fixed decoding delay.

High bandwidth multimedia applications may be introduced to a data network that has a well designed core and access topology, particularly if the core is based on Gigabit Ethernet technology and the access switches are not oversubscribed with respect to the backbone links. Even in this scenario there is the issue of speed mismatches between technologies such as Gigabit Ethernet and Fast Ethernet. This requires buffering and therefore leads to a requirement to queue and prioritize traffic. Layer 2 switches may mark frames using Class of Service (CoS) marking if end devices do not mark the frames themselves. These frames may then be assigned to hardware queues that exist on modern layer 2 switches. The most significant network bottlenecks exist at the remote access points, the WAN access, Internet access and the servers. Many of the technologies involved in QoS deal with how packets are dealt with as they enter and leave a network because merely adding more bandwidth at the edge is only a short term solution that just resolves capacity and perhaps some congestion problems. Adding bandwidth does not resolve jitter or add any traffic prioritization features.

Moreover, the queuing and packet prioritization that may result from buffering traffic at a packet network switch for QoS technologies may be limited by the availability of hardware resources at the switch. Application of techniques for effectively managing packet traffic buffering may be necessary to enable the best use of the available resources. However, the processing cost associated with the implementation of any buffering management technique may need to be considered in order to provide an effective solution.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for an adaptive queue and buffer control based on monitoring and active congestion avoidance in a packet network switch, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for an adaptive queue and buffer control based on monitoring and active congestion avoidance in a packet network switch. When memory from a memory source is not available for allocation to one or more adaptive queues in a network terminating device, such as a network switch, the TCP window size associated with the one or more adaptive queues may be reduced. The TCP window size may be reduced to a target TCP window size by utilizing one or more reduction steps, wherein the reduction steps may be programmable. When portions of the memory source become available for allocation to the adaptive queues, the TCP window size may be increased. The TCP window size may be increased to a target TCP window size by utilizing one or more increase steps, wherein the increase steps may be programmable. The TCP window size may be adjusted in a remote network device connected to the network switch by modifying the contents of a packet header that may be transmitted to the remote network device.

In some instances, better throughput performance may be achieved by reducing the TCP window size when there is not sufficient memory available to be allocated for receive queues instead of allowing the network device to drop frames. When a TCP frame is dropped, the receiving node may have to time-out and may then request retransmission of the dropped frame. In addition to the overhead required to manage these operations, the need for retransmission requests may significantly reduce overall throughput in a network connection.

A packet type may be referred to as a class of frames. For example, Internet control message protocol (ICMP) frames, Ethernet multicast or Broadcast frames, an Ethernet frame with a specific frame type value or with a particular virtual local area network (VLAN) ID. The frames that may be rate limited may comprise TCP synchronous (SYN) frames, other transport connection requests, ICMP frames, address resolution protocol (ARP) and reverse address resolution protocol (RARP), one or more of which may be utilized by attacks to change the state of a server. The TCP SYN may be a single bit in a field of six control bits in a TCP header. The SYN bit may be utilized to synchronize sequence numbers in order to ensure that every octet in a given TCP packet may be received and acknowledged. A packet type may be a characteristic that may be present in a frame or a multitude of frames that are, for example, a login request for a protocol. For example, iSCSI or a frame or a group of frames carrying some credential or connection request information. The packet type may comprise a complete field or portions of any of the above fields or any combination of fields or sub fields or wild cards.

Figure 1A:
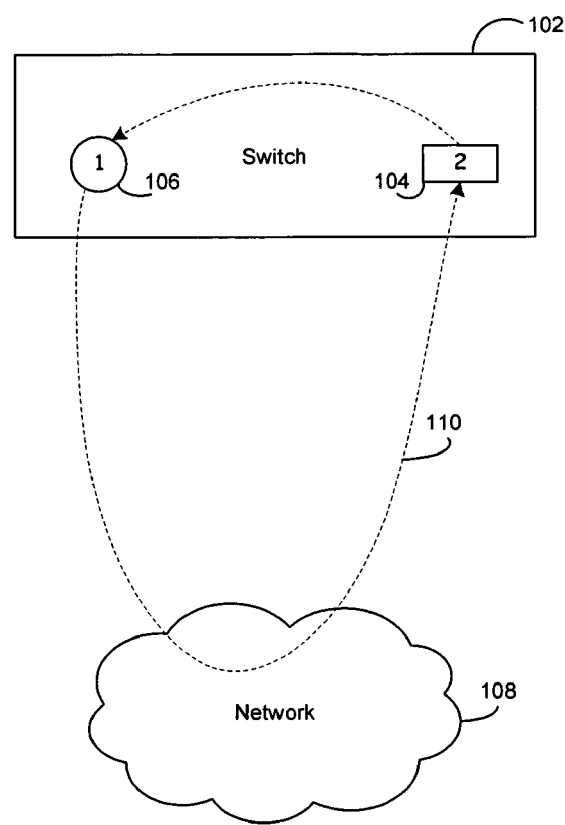
FIG. 1A is a diagram illustrating an exemplary loop in a network that may be utilized in connection with an embodiment of the invention.

FIG. 1A is a diagram illustrating an exemplary loop in a network that may be utilized in connection with an embodiment of the invention. Referring to FIG. 1A, there is shown a packet network switch 102, a network 108 and a network loop data path 110. The packet network switch 102 may comprise an input port 2 104 and an output port 1 106.

The loop 110 illustrates data being communicated from the output port 1 106 of the packet network switch 102 through the network 108 and being received at an input port 2 104 of the packet network switch 102. The same data that is received at the input port 2 104 may be then communicated back to the output port 1 106, thereby creating a loop. A loop 110 may occur when data is transmitted from the first output switch port 106, received at a first input port 104 of the same switch 102 and is communicated back to the first output switch port 106.

In accordance with various embodiments of the invention, a passive methodology may be utilized to detect and handle loops that may occur in a network 108. This may be utilized in instances where the spanning tree or rapid spanning tree algorithm is not running. Each frame handled by the switch 102 may be tracked by a classifier that examines each frame to determine its identity. For example, a hashing operation may be performed across each received frame and the corresponding hash information related to each frame may be stored, for example, in a table in memory. The hash information may be examined to determine whether there are multiple occurrences of the same received frame. The accuracy of the hashing algorithm may adequately detect multiple frame occurrences. If examination of the hashed information indicates that a frame is to be communicated through the switch 102 at a rate that may exceed a threshold or other determined rate, then this may indicate the presence of a loop in the network 108. In most networks, this may be a fair assumption since there would be no value in sending the same information through the switch constantly, except for testing purposes.

Figure 1B:
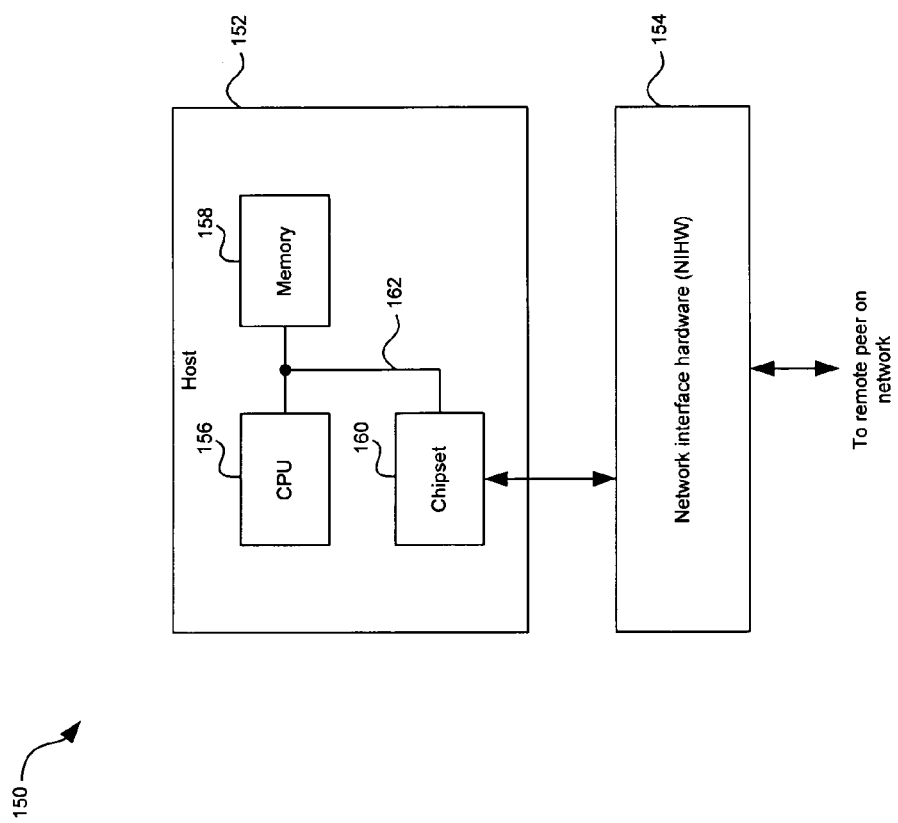
FIG. 1B is a block diagram illustrating a host with a separate network interface hardware (NIHW) block, in accordance with an embodiment of the invention.

FIG. 1B is a block diagram illustrating a host with a separate network interface hardware (NIHW) block, in accordance with an embodiment of the invention. Referring to FIG. 1B, there is shown a networking system 150, such as a server, a client, or a similar network machine, for example, that may comprise a host 152 and a network interface hardware (NIHW) device 154. The host 152 may comprise a central processing unit (CPU) 156, a memory 158, and a chipset 160. The CPU 156, the memory 158, and the chipset 160 may be communicatively coupled via, for example, a bus 162.

The networking system 150 may enable operation or support of various networking protocols. For example, the networking system 150 may enable supporting of transport control protocol/Internet protocol (TCP/IP) connections. In this regard, the networking system 150 may enable supporting of Internet control message protocol (ICMP), address resolution protocol (ARP), stream control transmission protocol (SCTP), and/or path maximum transmission unit (PMTU) discovery protocol, for example. The ICMP protocol may refer to an ISO/OSI layer 3 protocol that may allow routers, for example, to send error and/or control messages about packet processing on IP networks. The ARP protocol may refer to a low-level protocol within the TCP/IP suite that may map IP addresses to corresponding Ethernet addresses. The SCTP may support the transport of public switched telephone networks (PSTN) signaling messages over connectionless packet networks such as IP networks, for example. The PMTU may refer to a maximum unit of data that may be sent given a physical network medium. In other embodiments, SCTP may be used as the transport protocol rather than TCP.

The host 152 may enable setup parameters for network connections. For example, the host 152 may setup transport layer parameters comprising information that support time stamping, window scaling, delayed acknowledgment policy, flow control scheme to be used, congestion handling, selective acknowledgement (SACK), buffers to be used, and/or other transport related parameters. The host 152 may also setup network layer parameters comprising information that supports IPv4 or IPv6, for example, and options such as no fragments and/or hop limit. The host 152 may also setup data link layer parameters comprising information that supports virtual local area networks (VLAN) and source address to be used, for example.

The CPU 156 may comprise suitable logic, circuitry, and/or code that may enable supporting of the management and/or performance of networking operations associated with remote peers or clients on a network. The CPU 156 may also enable supporting of the management and/or performance of service applications that may be provided to the remote clients on the network.

The memory 158 may comprise suitable logic, circuitry, and/or code that may enable storage of information regarding the networking operations and/or service applications supported by the CPU 156. The chipset 160 may comprise suitable logic, circuitry, and/or code that may enable supporting of memory management, PCI master and arbitrator, graphics interface, I/O master for USB, audio, and/or peripheral devices, for example. In this regard, the chipset 160 may comprise at least one integrated circuit (IC) that provides services in support of the CPU 156 operations. In some instances, the services provided by the chipset 160 may be implemented in separate ICs. The choice of one or more ICs for implementing the chipset 160 may be based on the number and/or type of services provided.

The NIHW device 154 may comprise suitable logic, circuitry, and/or code that may enable communication with the host 152. In this regard, the NIHW device 154 may enable communication with the CPU 156, the memory 158, and/or the chipset 160. In some instances, the number of network connections that may be supported by the NIHW device 154 may be different than the number of network connections that may be supported by the host 152. For example, when the host 152 supports 10,000 connections and the NIHW device 154 supports 1,000 connections, then a connection ratio of 10:1 is supported by the networking system 150. In another example, if the host 152 supports 2,000 connections and the NIHW device 154 supports 1,000 connections, then a connection ratio of 2:1 is supported by the networking system 150. The connection ratio of a networking system that comprises a host and an NIHW device may be utilized when determining a connection setup model for a particular application.

Figure 1C:
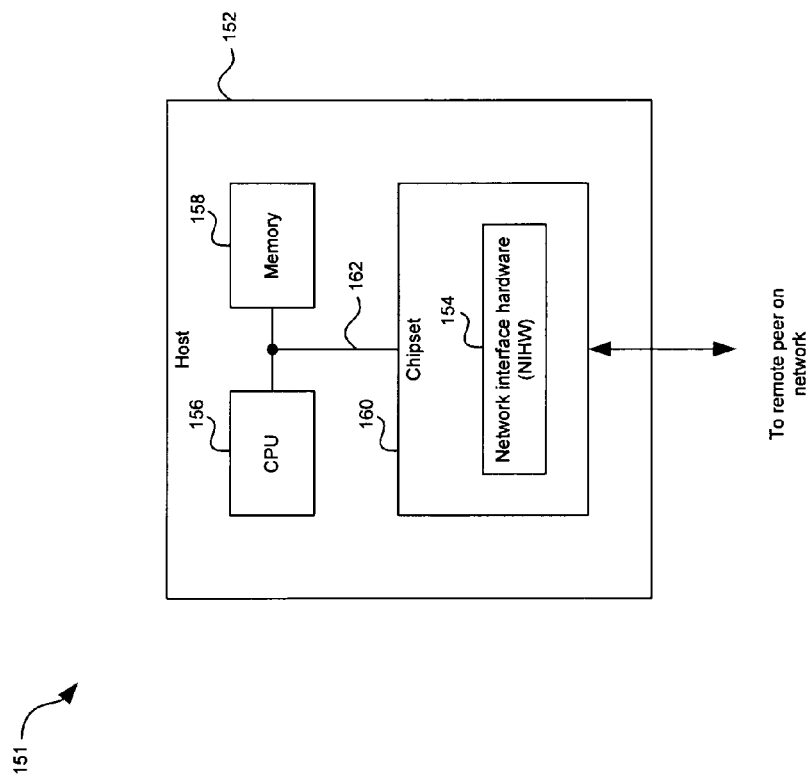
FIG. 1C is a block diagram illustrating a host with a network interface hardware block integrated within a chipset, in accordance with an embodiment of the invention.

FIG. 1C is a block diagram illustrating a host with a network interface hardware block integrated within a chipset, in accordance with an embodiment of the invention. Referring to FIG. 1C, there is shown a networking system 151 that may differ from the networking system 150 in FIG. 1B in that the NIHW device 154 in FIG. 1B is integrated into the chipset 160. In this regard, the NIHW device 154 may enable communication with other portions of the chipset 160, and with the CPU 156, and/or the memory 158 via the bus 162. The NIHW device 154 may comprise a classifier that may enable classification of received network packets.

Figure 2:
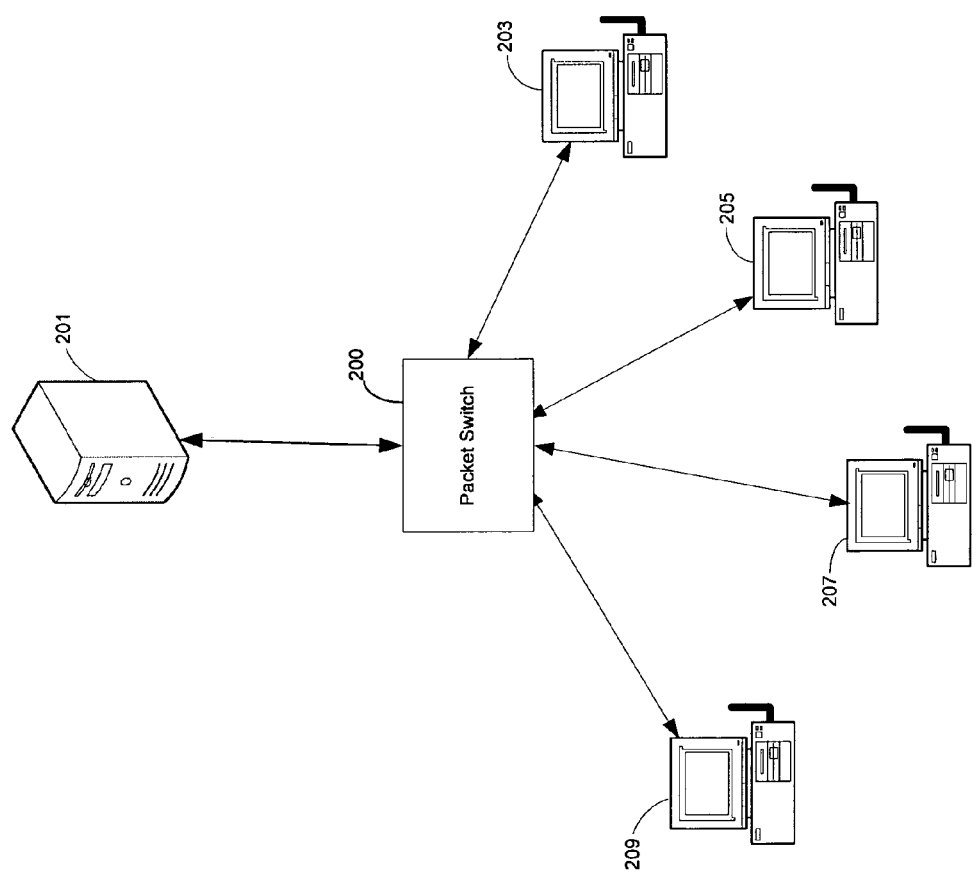
FIG. 2 is a block diagram of an exemplary packet switched network that may be utilized in accordance with an embodiment of the invention.

FIG. 2 is a block diagram of an exemplary packet switched network that may be utilized in accordance with an embodiment of the invention. Referring to FIG. 2, there is shown a host 201, a packet switch 200, and a plurality of clients, client 203, client 205, client 207 and client 209. The host 201 may comprise suitable logic, circuitry and/or code that may be enabled to limit its new connection acceptance rate or the number of suspected frames of a known profile, for example, Internet control message protocol (ICMP) in order to make sure that attacks may not disrupt its service level to legitimate clients.

The plurality of clients 203, 205, 207 and 209 may comprise suitable logic, circuitry and/or code that may be located on the premises of a customer, for example, data termination equipment such as routers. The packet switch 200 may comprise suitable logic, circuitry and/or code that may be enabled to provide clocking and switching services in a network. The plurality of clients 203, 205, 207 and 209 may be coupled to the packet switch 200 by a physical layer component and a link layer component. The physical layer component may define the mechanical, electrical, functional, and procedural specifications for the connection between the devices, for example, the RS-232 specification. The link layer component may define the protocol that establishes the connection between the plurality of clients 203, 205, 207 and 209 and the packet switch 200. For each connection established between the plurality of clients 203, 205, 207, and 209 and the packet switch 200, the packet switch 200 may correspond to a terminating network device in the connection and the client may correspond to another terminating network device in the same connection.

The host 201 may comprise suitable logic, circuitry and/or code that may be enabled to limit its new connection acceptance rate or the number of suspected frames of a known profile, for example, Internet control message protocol (ICMP) in order to make sure that attacks may not disrupt its service level to legitimate clients.

Figure 3:
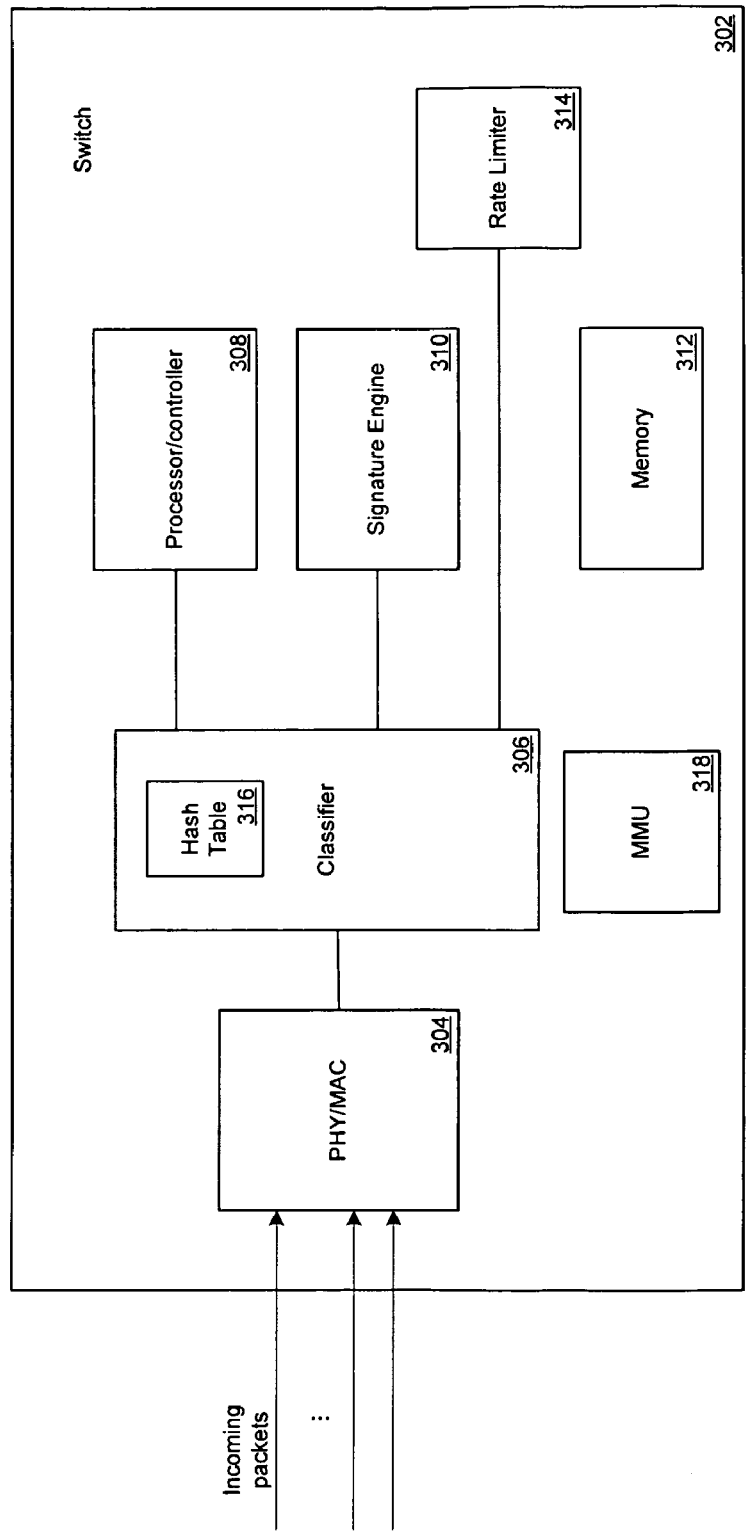
FIG. 3 is a diagram that illustrates a system for passive loop detection and prevention, in accordance with an embodiment of the invention.

FIG. 3 is a diagram that illustrates a system for passive loop detection and prevention, in accordance with an embodiment of the invention. Referring to FIG. 3, there is shown a switch 302. The switch 302 comprises a physical (PHY)/(medium access control) MAC layer block 304, a packet classifier 306, a processor/controller 308, a signature engine 310, a rate limiter 314, a memory 312, and a memory management unit (MMU) 318. The packet classifier 306 may comprise a hash table 316.

The PHY/MAC layer block 304 may comprise suitable logic, circuitry and/or code that may enable managing and maintaining of physical layer and MAC layer communications between terminating devices by coordinating access to a shared channel, for example, a wired channel or a wireless channel and utilizing protocols that enhance communications over a network medium. The PHY/MAC layer block 304 may enable receiving of the incoming network packets and may enable generation of the received packets, which may be communicated to the classifier 306.

The packet classifier 306 may comprise suitable logic, circuitry and/or code that may enable classification of received network packets. There is an increased likelihood of having collisions between the received network packets if, for example, a 4 byte cyclic redundancy check (CRC) is utilized, due to the limited number of bits being used. A 64 byte CRC may be utilized to reduce the likelihood of collisions between the network packets. To further decrease the likelihood of collisions, the CRC may be combined with other packet information to generate CRC-like hash information. A CRC is a type of hash function used to produce a checksum, which is a small, fixed number of bits against a block of data, such as a packet of network traffic. The checksum may be used to detect and correct errors after transmission or storage. A CRC may be computed and appended before transmission or storage, and verified afterwards by a recipient in order to confirm that no changes have occurred to the block of data during transmission.

The hash table 316 may be utilized to track a finite number of connection flows. For example, hashed entries for 5000 connection flows may be tracked and once the hash table is filled, a FIFO mechanism may be utilized to purge or eliminate older entries from the hash table in order to make space for newly hashed entries. The hash table 316 may be a data structure that associates keys with values. The hash table 316 may support lookup operations by transforming the key using a hash function into a hash, a number that the hash table 316 uses to locate the desired value.

The processor 308 may comprise suitable logic, circuitry, and/or code that may enable supporting of the management function to keep track of connections or traffic flows at the macro-level state. The macro-level state may indicate that only partial context information is maintained for each connection.

The signature engine 310 may comprise suitable logic, circuitry and/or code that may enable examining of the packets for each connection flow and generate various keys based on the hashed values of the CRC, for example. The signature engine 310 may be enabled to detect the type of packet by examining the header of the incoming packet. Only a portion of the incoming network packet frame may be necessary to detect the type of packet. The rate limit engine 314 may comprise suitable logic, circuitry and/or code that may provide an enforcement function to limit a rate of various connections to a specified rate based on results from the packet classifier 306. It may be more efficient to throttle back a data rate that is associated with a connection than terminating a connection associated with a loop. For example, if a loop is detected for a particular connection, the rate limiter 314 may enable reducing a transmission rate of the connection from a million frames per second to 500 frames per second, for example.

The memory 312 may comprise suitable logic, circuitry and/or code that may enable storage of hash information used for generating the CRC or CRC-type hash information. There may be a tradeoff between accuracy and the amount of memory that is required to store hash information used for generating the CRC or CRC-type hash information. The memory 312 may also enable storing current values for a receive TCP window size and for a send TCP window size associated with connections between network devices and the switch 302.

The MMU 318 may comprise suitable logic, circuitry and/or code that may enable managing the storage of data based on the type of data contained in the received network packets determined by the classifier 306 and signature engine 310. The MMU 318 may enable dynamic allocation of buffer or memory based on the type of application running and a state of the traffic currently being received.

Voice packets may be evenly spaced without jitter. Dejitter buffers may be utilized to buffer packets as they are received and then play them out as a steady stream thereby eliminating the variable delay. The overall delay may increase slightly as a result of implementing a de-jitter buffer. The packets that arrive so late that they fall outside of the de-jitter buffer may be discarded. The QoS may enable predictable response times, management of delay sensitive applications, management of jitter sensitive applications, and control of packet loss when congestion occurs during a burst. The QoS may also enable setting of traffic priorities, dedication of bandwidth on a per application basis, avoidance of congestion, and management of congestion when it occurs. The QoS may operate on one or more of three levels, for example, best effort, differentiated service and integrated service. The differentiated service may deal with differing levels of QoS on a packet-by-packet basis. The integrated service may request a level of service by an application to a network. Data may be sent after confirmation that the service level is guaranteed to be available.

In operation, the received packets may be marked and classified according to policies and the behavior of the packet traffic based on IP precedence and DSCP and is most effective when carried out as far to the edge of the network as possible, for example, at a VoIP phone. The packet traffic congestion may be managed by prioritizing traffic based on the marks using queuing technologies that may respond to traffic classes. Congestion may be avoided by dropping packets that are not a high priority where low priority packets may be weeded out of a queue. The packet traffic may be regulated so that the ingress or egress of traffic may be limited depending on the class/markings of the packets, which may be known as traffic shaping. Traffic shaping may be performed to maximize the use of bandwidth by specifying peak and average traffic rates. The packets may be fragmented and compressed to maximize the bandwidth usage of WANS.

The Layer 2 Class of Service (CoS) may be provided within the tag control info (TCI) field of an Ethernet frame. The 3 bits give 8 different classes which have the values assigned as follows:

000 (0)—Routine
  001 (1)—Priority
  010 (2)—Immediate
  011 (3)—Flash
  100 (4)—Flash Override
  101 (5)—Critical
  110 (6)—Internetwork Control
  111 (7)—Network Control These map to the IP precedence values in the type of service (ToS) field of the IP datagram. Layer 2 switches may have a plurality of queues per port, which may be used during periods of congestion to allocate frames with a particular CoS value into appropriate queues and perform, for example, a weighted round robin (WRR) approach to servicing these queues. Differential Service (Diffserv) is concerned with classifying packets as they enter the local network based on the classification of the flow of packet traffic. The flow of packet traffic may be defined by various elements, for example, a source IP address, a destination IP address, a source port, a destination port and/or the transport protocol. A flow of packet traffic that has been classified or marked may then be acted upon by other QoS mechanisms.

The switch 302 may be part of an exemplary networking system that handles switching of transport control protocol/Internet protocol (TCP/IP) packets, such as the switch 102 and the networking systems 150 and 151 in FIGS. 1A through 1C respectively. As such, the switch 302 may enable adjusting the size of a TCP window for communicating with a terminating device in a TCP/IP connection. The switch 302 may comprise at least one register that may be utilized for storing a send TCP window size (SNDWND) value and a receive TCP window size (RCVWND) value. The SNDWND value may correspond to the TCP window size for sending information from the switch 302 to a remote device on the network. The RCVWND value corresponds to the TCP window size for receiving information on the switch 302 from a remote device on the network.

In a connection between the switch 302 and another networking device, such as a server, for example, the switch 302 may indicate to the server the number of bytes that the switch 302 may be able to receive at any one instant in time from the server, that is, the RCVWND value for the switch 302. The RCVWND value for the switch 302 may correspond to the server's SNDWND value. Similarly, the server may indicate to the switch 302 the number of bytes that the server may be able to receive from the switch 302, that is, the server's RCVWND value. The server's RCVWND value may correspond to the SNDWND value for the switch 302. In this regard, the switch 302 may have associated with each connection a first TCP window size for receiving information and a second TCP window size for sending information, for example. In some instances, the first and second TCP window sizes associated with a network connection may be the same.

The appropriate receive and send TCP window sizes of a particular connection may be implemented by utilizing the SNDWND value and the RCVWND value stored in buffers or registers at each end of the connection. The receive TCP window size represented by the RCVWND value may indicate how much data the switch 302 may be able to receive or handle in its own receive buffer at any one instant in time before the received data may be passed or transferred to an application process for further processing. Once the data is received, an acknowledgement may be sent back to the sender that the data was received. The received data may then be transferred from the receive buffer to the appropriate application process. In some instances, received data that is acknowledged may not be immediately transferred from the receive buffer to the application process and the receive buffer may fill up faster than the speed at which the received data may be transferred out of the receive buffer. When this occurs, the switch 302 may need to adjust the receive TCP window size, that is, the RCVWND value, in order to prevent the receive buffer from being overloaded. Adjusting the RCVWND value in the switch 302 may also require adjusting the SNDWND value in the sender.

Changes to either the RCVWND value or the SNDWND value, that is, the receive TCP window size or the send TCP window size respectively, in the switch 302 may carry processing costs associated with it. Moreover, the RCVWND and SNDWND values may need to be adjusted for each connection between a terminating network device and the switch 302. The switch 302 may have default RCVWND and SNDWND values and may enable modifying or adjusting the RCVWND and SNDWND values from their default settings after a connection is established.

Figure 4A:
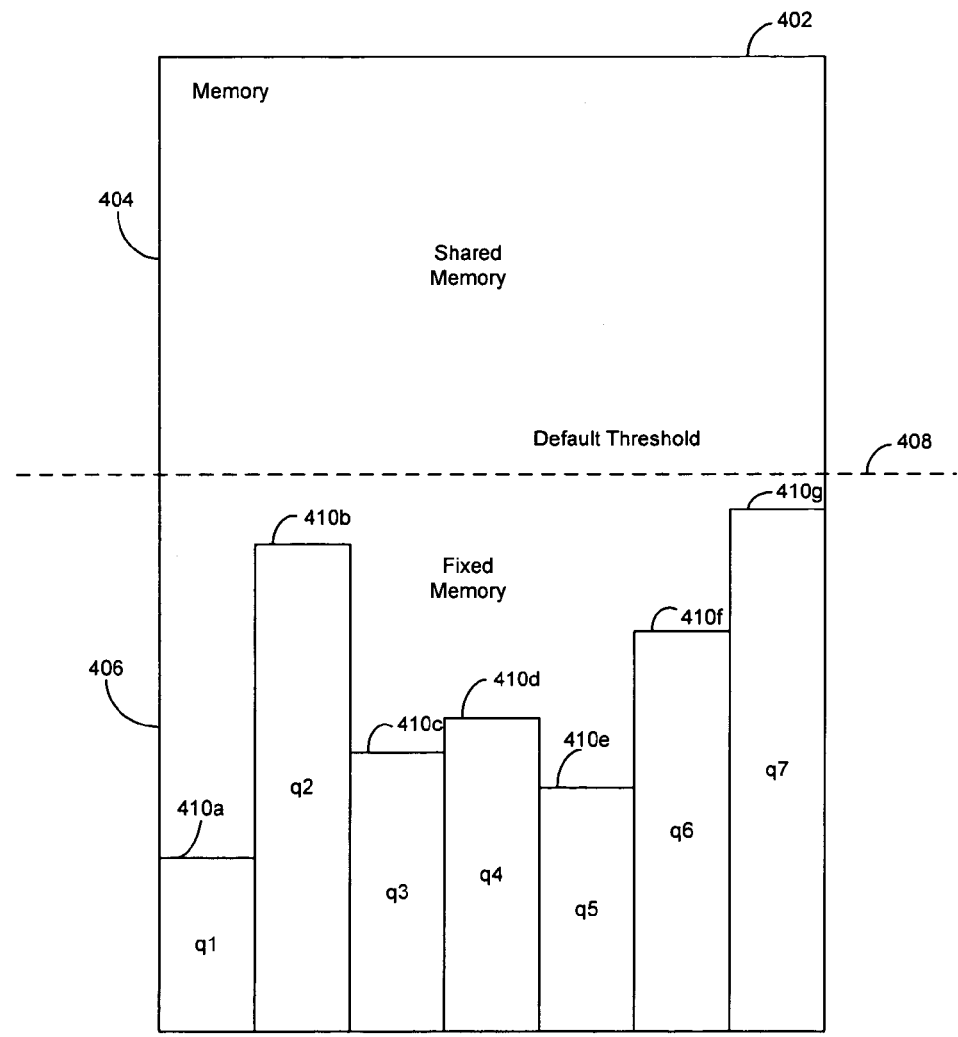
FIG. 4A is a diagram illustrating implementation of an adaptive queue and buffer control based on monitoring in packet network switches, in accordance with an embodiment of the invention.

FIG. 4A is a diagram illustrating implementation of an adaptive queue and buffer control based on monitoring in packet network switches, in accordance with an embodiment of the invention. Referring to FIG. 4A, there is shown a memory 402. The memory 402 may correspond to a receive buffer for the switch 302 in FIG. 3, for example. In this regard, the memory 402 may be a portion of the memory 312, for example. The memory 402 may be partitioned into a shared memory 404 and a fixed memory 406 by a default threshold 408. The fixed portion of the memory 406 may be utilized to store a plurality of packet queues, q1 410a, q2 410b, q3 410c, q4 410d, q5 410e, q6 410f, and q7 410g, where each queue is pre-allocated. The shared portion of the memory 404 may be utilized to dynamically allocate any of the queues. The shared memory 404 may be allocable among the plurality of queues. The fixed memory 406 may be pre-assigned or pre-reserved for each queue.

The packet classifier 306 may enable determining the queuing of incoming packet frames based on the type of data contained in the received network packets. Each received packet frame may be associated with an 802.1p priority tag having a priority level of 0-7, for example. In an embodiment of the invention, the packet classifier 306 may assign its own tag to each the received packet frames. At the Internet protocol (IP) level, there is also a differential service code point (DSCP) type of service (TOS), which provides up to 64 levels of priority or classes. VoIP may require a high priority so as to minimize latency and dropping of frames. For example, a VoIP packet may arrive having a high priority and may be placed in a first of 7 output queues, namely (q1) 410a, by the MMU. If a network file system (NFS) frame arrives it may be placed in the seventh queue (q7) 410g, for example, which is larger than the first queue q1 410a as NFS traffic is generally handled by UDP, which is larger than a VoIP packet and very sensitive to dropped frames. As a result, when the NFS frames are being queued in q7 410g, the default threshold 408 is not exceeded.

Figure 4B:
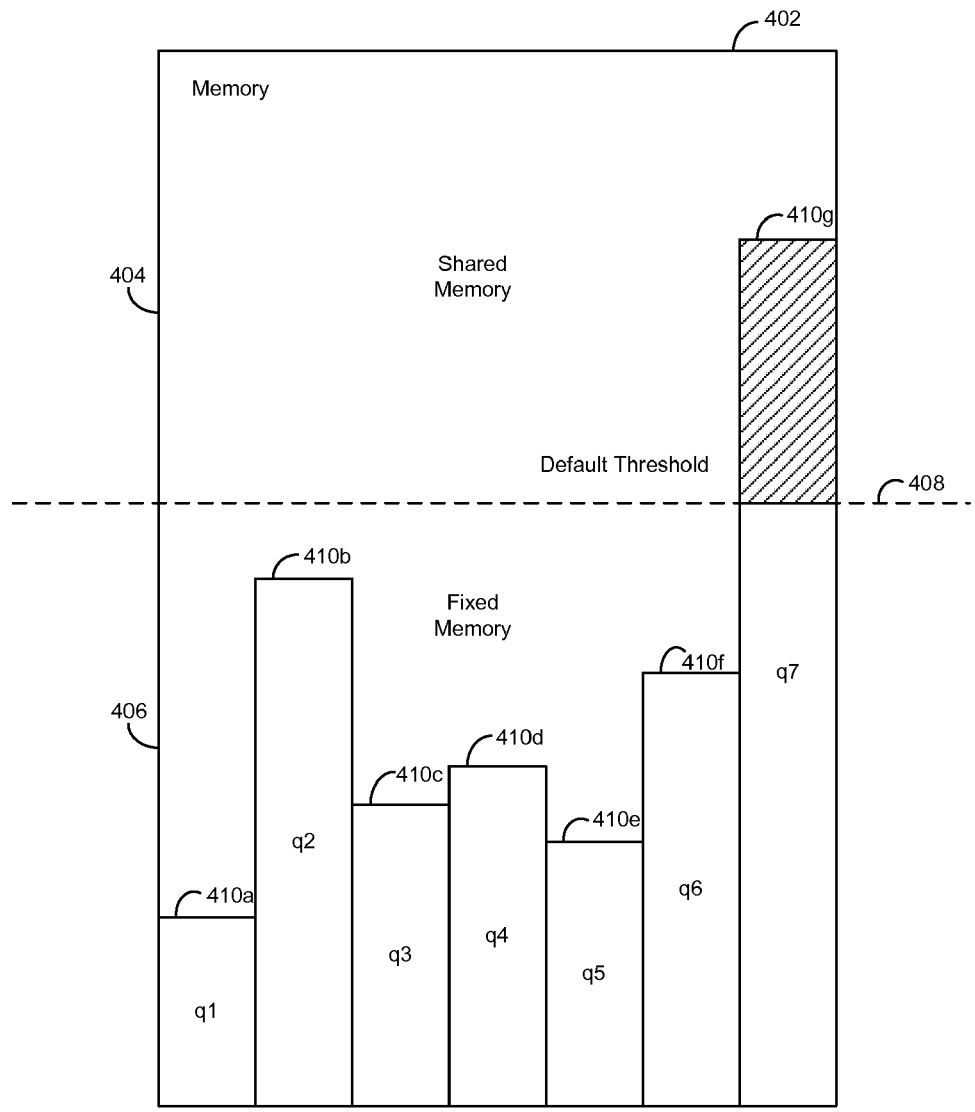
FIG. 4B is a diagram illustrating implementation of an adaptive queue and buffer control where a particular queue receives more data than it may hold, in accordance with an embodiment of the invention.

FIG. 4B is a diagram illustrating implementation of an adaptive queue and buffer control where a particular queue receives more data than it may hold, in accordance with an embodiment of the invention. Referring to FIG. 4B, there is shown a memory 402. The memory 402 may be partitioned into a shared memory 404 and a fixed memory 406 by a default threshold 408. The fixed portion of the memory 406 may be utilized to store a plurality of packet queues, q1 410a, q2 410b, q3 410c, q4 410d, q5 410e, q6 410f, and q7 410g, where each queue is pre-allocated. The shared portion of the memory 404 may be utilized to dynamically allocate any of the queues. The shared memory 404 may be allocable among the plurality of queues. The fixed memory 406 may be pre-assigned or pre-reserved for each queue.

The queue (q7) 410g may receive more NFS data than it may hold. As a result, additional memory may be allocated from the shared memory 404 to q7 410g. This method of allocating additional memory to the queues when needed may be described as a reactionary methodology.

In accordance with an embodiment of the invention, a method and system are provided for allocating memory to the queues based on the states of the actual traffic that is flowing through the switch 102 (FIG. 1A). An application aware mechanism is utilized to manage the queues. In instances where all the flows arrive simultaneously, then it is undesirable to drop any packets. Based on the traffic types that are detected, a guaranteed queue may be dynamically adjusted so as to ensure that there will be sufficient memory available for queuing the received traffic. Accordingly, the fixed portion of the memory 406 allocated for the queues may be adjusted based on the traffic flows instead of when the threshold 408 is exceeded. Since memory is allocated dynamically, there is no fixed portion of the memory that is always present for a particular queue. Hence, the memory is allocated to the queues as needed and deallocated when they are no longer needed. In instances where a queue is no longer required, the resources allocated for that queue may be deallocated and returned to a pool of free memory resources.

Figure 4C:
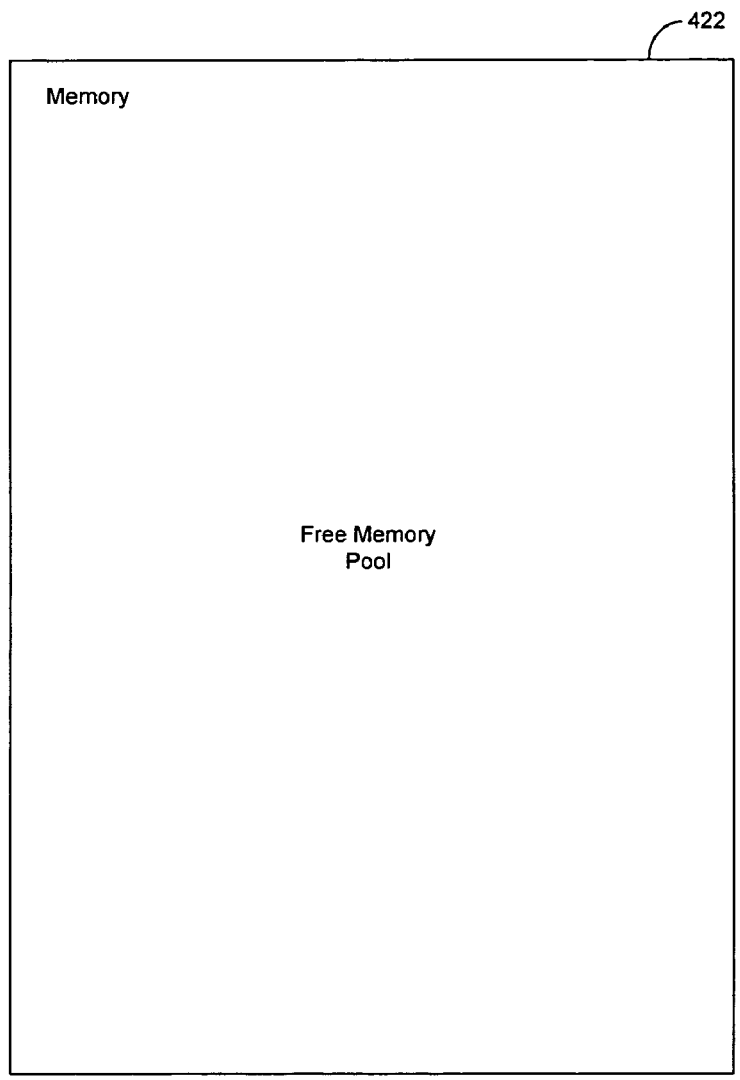
FIG. 4C is a diagram illustrating a pool of memory in which no resources are allocated, in accordance with an embodiment of the invention.

FIG. 4C is a diagram illustrating a pool of memory in which no resources are allocated, in accordance with an embodiment of the invention. Referring to FIG. 4C, there is shown a memory 422 with a free memory pool, where no memory is pre-reserved or pre-allocated for any particular queue.

Figure 4D:
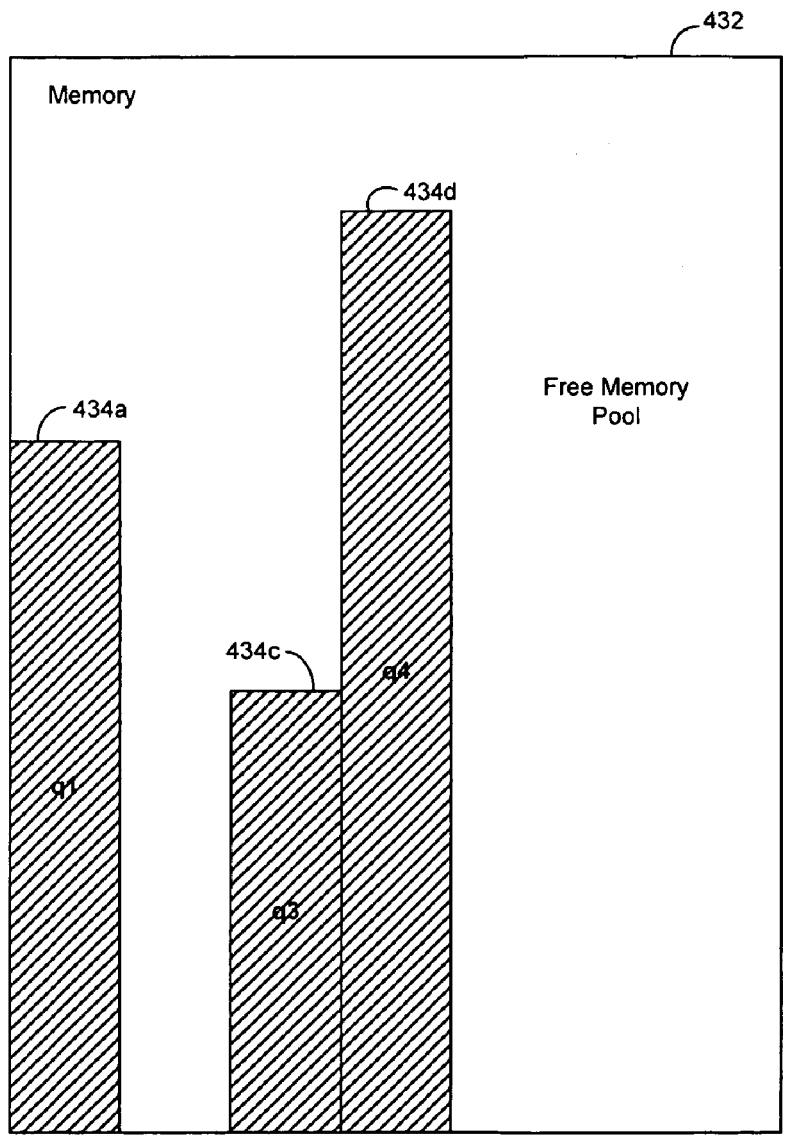
FIG. 4D is a diagram illustrating a pool of memory being allocated to queues q1, q3, and q4, in accordance with an embodiment of the invention.

FIG. 4D is a diagram illustrating a pool of memory being allocated to queues q1, q3, and q4, in accordance with an embodiment of the invention. Referring to FIG. 4D, there is shown a memory 432 that comprises a plurality of allocated queues q1 434a, q3 434c and q4 434d. The remaining free pool of memory remains available to be allocated. There is currently no flow for q2 and so no memory is utilized for q2.

Figure 4E:
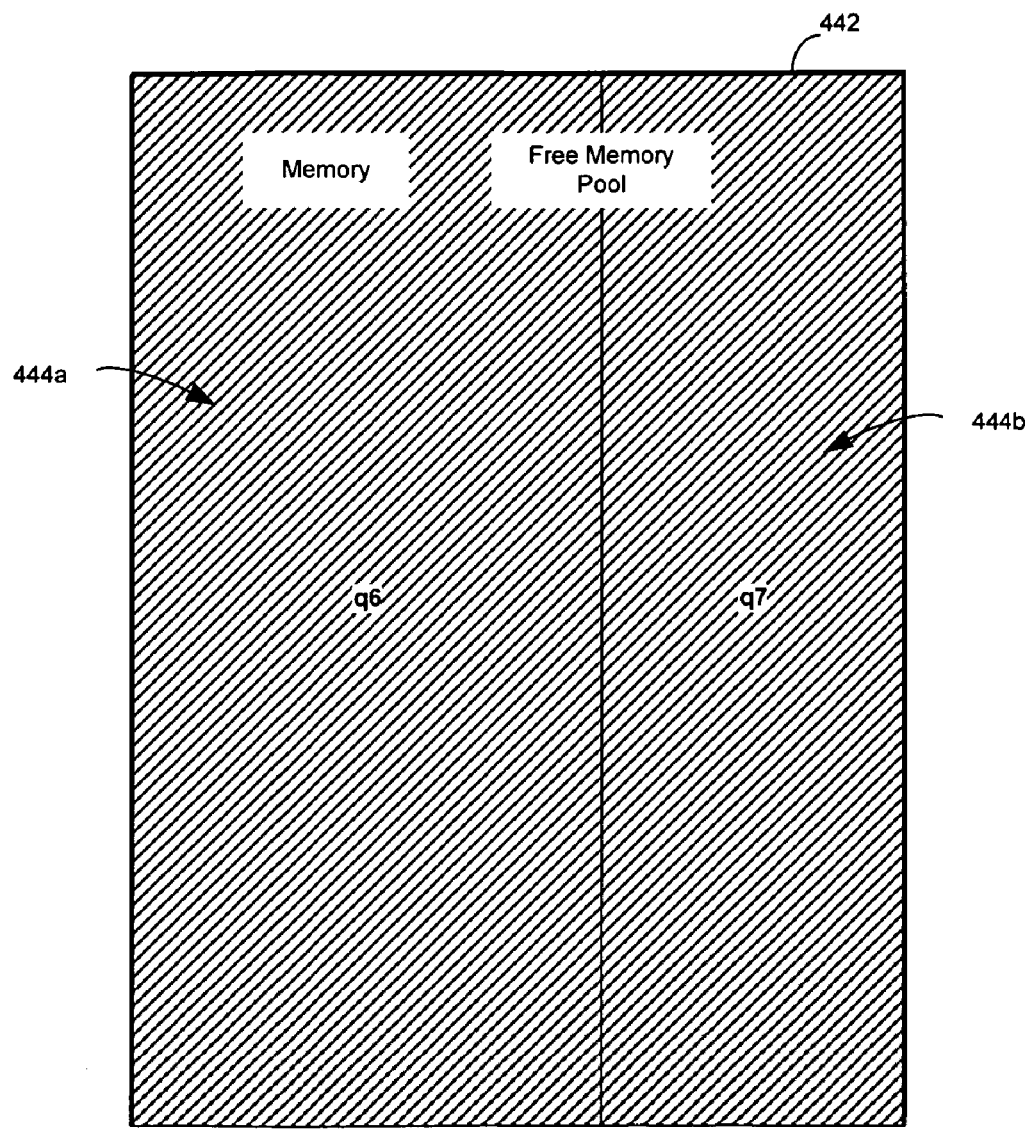
FIG. 4E is a diagram illustrating an entire pool of memory being allocated to queues q6, and q7, in accordance with an embodiment of the invention.

FIG. 4E is a diagram illustrating an entire pool of memory being allocated to queues q6, and q7, in accordance with an embodiment of the invention. Referring to FIG. 4E, there is shown a memory 442 that comprises allocated queues q6 444a and q7 444b. There remains no free pool of memory available to be allocated for any other queue. This may occur when high data traffic arrives in q6 444a and q7 444b and all the available free pool of memory is allocated to maintain the traffic flow in these queues. As a result, the allocation of memory to any of the queues, including the q6 444a and q7 444b, may no longer be guaranteed and the network switch, such as the switch 302, may need to adjust the RCVWND value associated with at least a portion of the queues in order to control the flow of traffic and reduce the speed at which the terminating network devices are communicating with the switch 302. Adjusting the RCVWND value changes the receive TCP window size for the corresponding queues in order to reduce the rate at which the queues utilize the free pool of memory, for example. Adjusting the RCVWND values in the switch 302 may also require adjusting the SNDWND values in the terminating network devices communicating with the switch 302.

For example, if the RCVWND value in the switch 302 that is associated with one of the TCP/IP connections is 64k bytes and the classifier 306, the signature engine 310, and/or the MMU 318 determine that the free pool of memory, that is, the memory 442 is being depleted, then the RCVWND value associated with that connection may be reduced to, for example, 16k bytes. The associated SNDWND value of the network device transmitting data to the switch 302 may be adjusted accordingly. When the classifier 306, the signature engine 310, and/or the MMU 318 determine that there is sufficient memory available in the free pool of memory, then the RCVWND value in the switch 302 may be increased until the original 64k bytes is reached. Again, the associated SNDWND value of the network device transmitting data to the switch 302 may be adjusted accordingly. In this regard, the dynamic allocation of memory from the free pool of memory to the receive buffer or receive queues based on the type of application running, the current state of the traffic being received, and the adjustment of the receive TCP window size in the switch 302 may be referred to as active congestion avoidance.

The switch 302 may reduce or increase the receive TCP window size via changes in the RCVWND value by using a plurality of steps in order to reach a target size. The steps and the receive TCP window size target may be programmed via the processor/controller 308 and may be stored in the memory 312, for example.

In another example, when traffic for one TCP/IP connection to the switch 302 comprises jumbo frames, such as packets or segments of 10k bytes of data, for example, and 6 to 7 packets of data are received in one burst, a 64k bytes receive buffer or receive queue may be required to handle the data. If there are 100 bursts associated with 100 TCP/IP connections all arriving at approximately the same instant in time, then there would be insufficient memory available in the free pool of memory to adequately allocate memory to buffer the received data and avoid an overflow in the receive buffer. However, the switch 302 may adjust the receive TCP window sizes by changing the RCVWND values of at least a portion of the TCP/IP connections in order to reduce the rate at which data is being communicated to the switch 302 by the terminating network devices. After the data bursts have occurred and the traffic flow has returned to a manageable rate, the switch 302 may again adjust the receive TCP window sizes by changing the RCVWND values in order to increase the communication rate.

Figure 5:
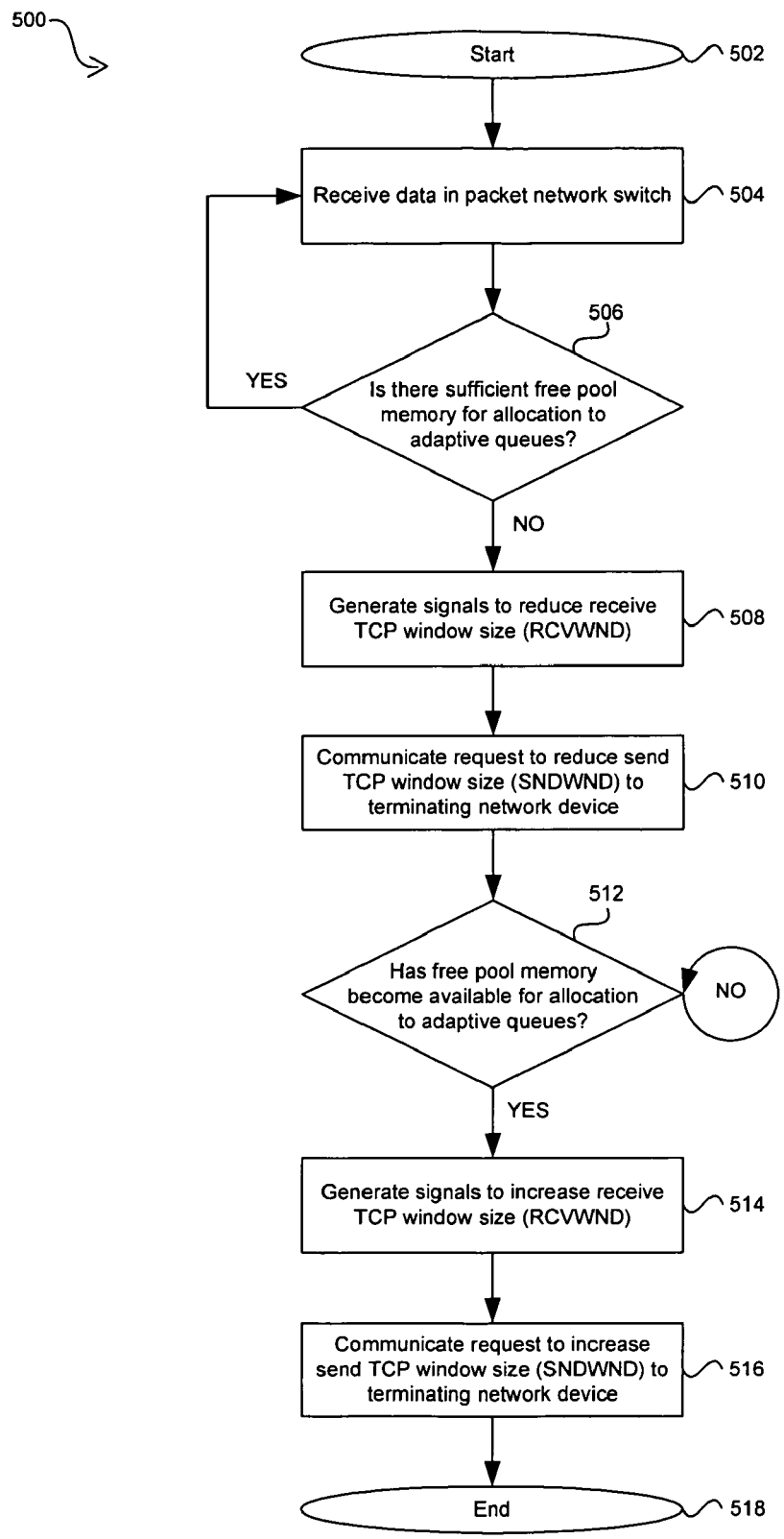
FIG. 5 is a flow diagram illustrating window size adjustment based on the availability of memory from a pool of memory to an adaptive queue, in accordance with an embodiment of the invention.

FIG. 5 is a flow diagram illustrating window size adjustment based on the availability of memory from a pool of memory to an adaptive queue, in accordance with an embodiment of the invention. Referring to FIG. 5, there is shown a flow diagram 500. After start step 502, in step 504, data is received in a packet network switch, such as the switch 302 in FIG. 3, for example. The received data may correspond to a plurality of network connections between the switch 302 and terminating network devices communicatively coupled to the switch 302. The received data may be buffered in adaptive queues, such as those described in FIGS. 4A through 4E. In step 506, when there is sufficient memory available in the free pool of memory for allocation to the adaptive queues, the process may proceed to step 504 where additional data may continue to be received by the switch 302.

Returning to step 506, when there is insufficient memory available in the free pool of memory to guarantee the allocation of memory to the adaptive queues, the process may proceed to step 508. In step 508, the PHY/MAC layer block 304 may be utilized to adjust the receive TCP window size in the switch 302 for at least some of the TCP/IP connections by changing, for example, the corresponding RCVWND values. The switch 302 may generate at least one signal that enables modifying the corresponding RCVWND values. In this regard, the receive TCP window size of a TCP/IP connection may be reduced to a target TCP window size by changing the appropriate RCVWND value in accordance with the characteristics of the network connection. The target TCP window size may be selected to be sufficiently small to enable the switch 302 to avoid buffer overflow based on a single adjustment of the receive TCP window size.

In step 510, the switch 302 may communicate the request to reduce the send TCP window size to the appropriate terminating network devices. Smaller SNDWND values reduce the rate at which data is communicated to the switch 302 until the availability of memory from the free pool of memory may be guaranteed. In this regard, the switch 302 may generate at least one signal that enables modifying content in the header of packets that may be transmitted to the appropriate terminating networking devices to adjust their send TCP window sizes, that is, their SNDWND values. The terminating network device may acknowledge receiving the request and may reduce the send TCP window size by changing the SNDWND value in accordance with the request.

In step 612, when the memory available in the free pool of memory remains insufficient to guarantee the allocation of memory to the adaptive queues, the switch 302 may continue to monitor the availability of the free pool of memory. When sufficient memory in the free pool of memory becomes available to guarantee the allocation of memory to the adaptive queues, the process may proceed to step 514.

In step 514, the PHY/MAC layer block 304 may be utilized to increase the receive TCP window size in the switch 302 for at least some of the TCP/IP connections by changing, for example, the corresponding RCVWND values. The switch 302 may generate at least one signal that enables increasing the corresponding RCVWND values. In this regard, the receive TCP window size of a TCP/IP connection may be increased to an original or default receive TCP window size by changing the appropriate RCVWND value in accordance with the characteristics of the network connection.

In step 516, the switch 302 may communicate the request to increase the send TCP window size to the appropriate terminating network devices. Larger SNDWND values increase the rate at which data is communicated to the switch 302 now that the availability of memory from the free pool of memory may be guaranteed. In this regard, the switch 302 may generate at least one signal that enables modifying content in the header of packets that may be transmitted to the appropriate terminating networking devices to adjust their send TCP window sizes, that is, their SNDWND values. The terminating network device may acknowledge receiving the request and may increase the send TCP window size by changing the SNDWND value in accordance with the request. After step 516, the process may proceed to end step 518.

Figure 6:
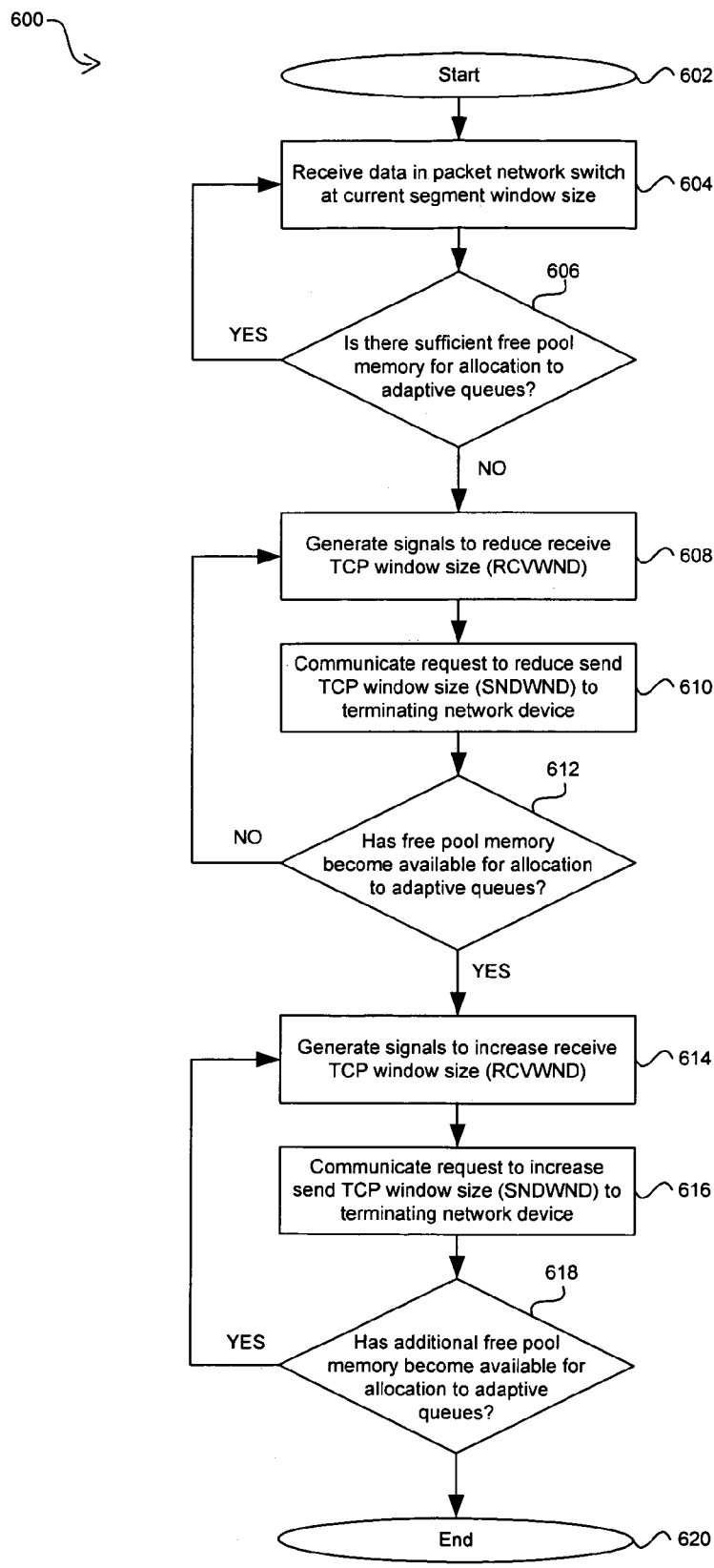
FIG. 6 is a flow diagram illustrating multiple window size adjustments based on the availability of memory from a pool of memory to an adaptive queue, in accordance with an embodiment of the invention.

FIG. 6 is a flow diagram illustrating multiple window size adjustments based on the availability of memory from a pool of memory to an adaptive queue, in accordance with an embodiment of the invention. Referring to FIG. 6, there is shown a flow diagram 600. After start step 602, in step 604, data is received in a packet network switch, such as the switch 302 in FIG. 3, for example. The received data may correspond to a plurality of network connections between the switch 302 and terminating devices communicatively coupled to the switch 302. The received data may be buffered in adaptive queues, such as those described in FIGS. 4A through 4E. In step 606, when there is sufficient memory available in the free pool of memory for allocation to the adaptive queues, the process may proceed to step 604 where additional data may continue to be received by the switch 302.

Returning to step 606, when there is not sufficient memory available in the free pool of memory to guarantee the allocation of memory to the adaptive queues, the process may proceed to step 608. In step 608, the PHY/MAC layer block 304 may be utilized to adjust the receive TCP window size in the switch 302 for at least some of the TCP/IP connections by changing, for example, the corresponding RCVWND values. The switch 302 may generate at least one signal that enables modifying the corresponding RCVWND values. In this regard, the receive TCP window size of a TCP/IP connection may be reduced to a target TCP window size by changing the appropriate RCVWND value in accordance with the characteristics of the network connection and based on programmed and/or stored reduction steps. For example, for a particular TCP/IP network connection, the original receive TCP window size may be 64k bytes, the reduction steps may be 4k bytes, and a target TCP window size may be 16k bytes. Reduction steps need not be uniform and may vary in accordance with a programmed or selected schedule, for example. As a result, a first pass through step 608 may generate a receive TCP window size of 60k bytes, for example.

In step 610, the switch 302 may communicate the request to reduce the send TCP window size to the appropriate terminating network devices. Smaller SNDWND values reduce the rate at which data is communicated to the switch 302 until the availability of memory from the free pool of memory may be guaranteed. In this regard, the switch 302 may generate at least one signal that enables modifying content in the header of packets that may be transmitted to the appropriate terminating networking devices to adjust their send TCP window sizes, that is, their SNDWND values. The terminating network device may acknowledge receiving the request and may reduce the send TCP window size by changing the SNDWND value in accordance with the request.

In step 612, when the memory available in the free pool of memory remains insufficient to guarantee the allocation of memory to the adaptive queues, the process may return to step 608 where subsequent reduction steps may be utilized to further reduce the receive TCP window size in the switch 302 and the corresponding send TCP window size in the appropriate terminating network device. For example, after the initial 4k bytes reduction, an additional 4k bytes reduction may be performed to bring the receive TCP window size to 56k bytes. In some instances, step 608 may be performed a plurality of times until sufficient memory becomes available for allocation to the adaptive queues or until the target TCP window size is reached.

Returning to step 612, when sufficient memory in the free pool of memory becomes available to guarantee the allocation of memory to the adaptive queues, the process may proceed to step 614. In step 614, the PHY/MAC layer block 304 may be utilized to increase the receive TCP window size in the switch 302 for at least some of the TCP/IP connections by changing, for example, the corresponding RCVWND values. The switch 302 may generate at least one signal that enables increasing the corresponding RCVWND values. In this regard, the receive TCP window size of a TCP/IP connection may be increased to a target TCP window size, such as the original receive TCP window size, for example, by changing the appropriate RCVWND value in accordance with the characteristics of the network connection and based on programmed and/or stored increase steps. For example, if a particular TCP/IP network connection had a receive TCP window size reduced to 16k bytes from an original value of 64k bytes, then increase steps of 4k bytes may be utilized to return the receive TCP window size to 64k bytes. As a result, a first pass through step 614 may generate a receive TCP window size of 20k bytes, for example.

In step 616, the switch 302 may communicate the request to increase the send TCP window size to the appropriate terminating network devices. Larger SNDWND values increase the rate at which data is communicated to the switch 302 now that the availability of memory from the free pool of memory may be guaranteed. In this regard, the switch 302 may generate at least one signal that enables modifying content in the header of packets that may be transmitted to the appropriate terminating networking devices to adjust their send TCP window sizes, that is, their SNDWND values. The terminating network device may acknowledge receiving the request and may reduce the send TCP window size by changing the SNDWND value in accordance with the request.

In step 618, when additional memory has become available in the free pool of memory, the process may return to step 614 where subsequent increase steps may be utilized to further increase the receive TCP window size for the appropriate TCP/IP connections in the switch 302. For example, after the initial 4k bytes increase, an additional 4k bytes increase may be performed to bring the receive TCP window size to 24k bytes. In some instances, step 618 may be performed a plurality of times until sufficient memory becomes available to reach the original receive TCP window size.

Figure 7A:
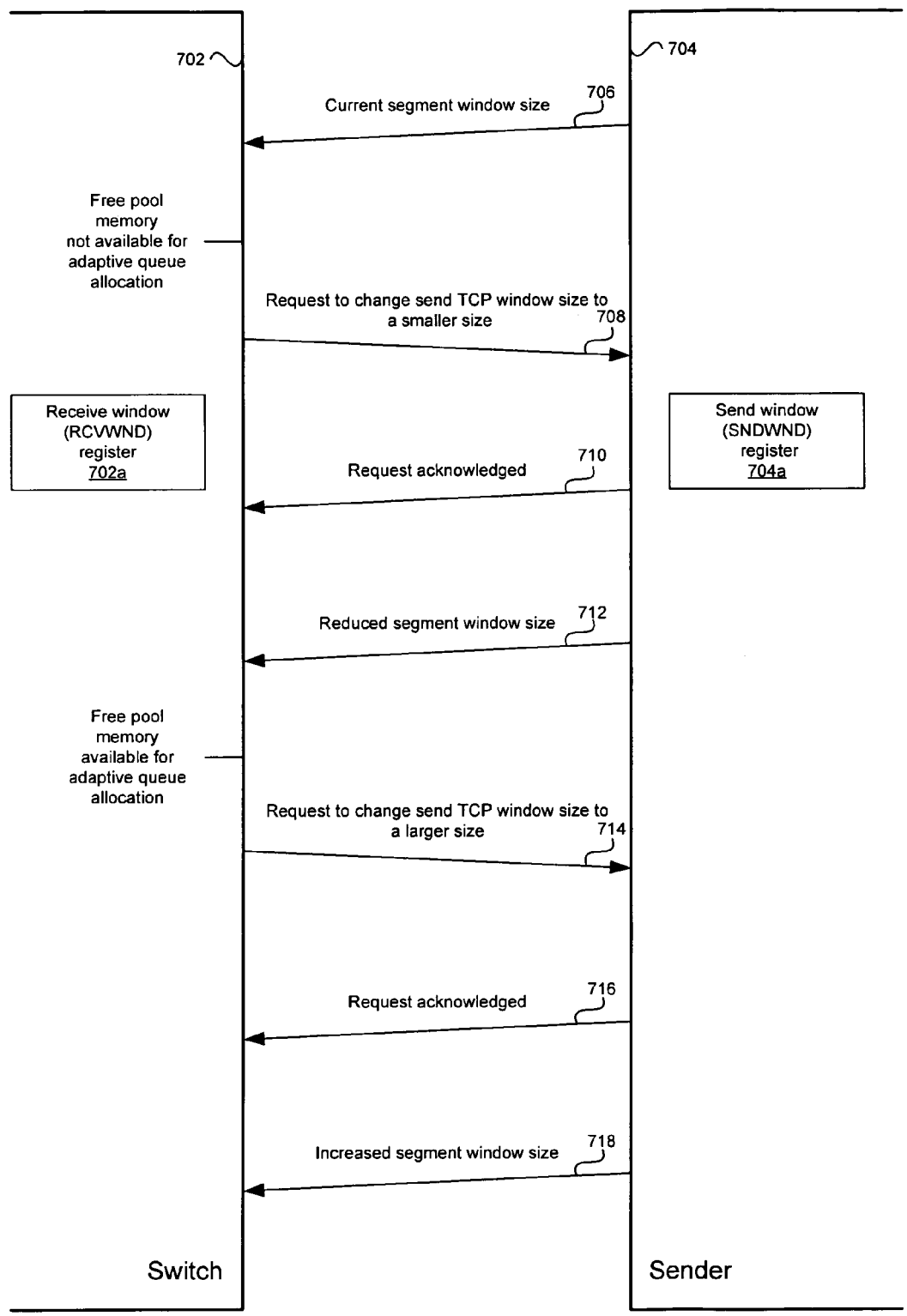
FIG. 7A is a diagram illustrating signaling for window size control as described in FIG. 5, in accordance with an embodiment of the invention.

FIG. 7A is a diagram illustrating signaling for window size control as described in FIG. 5, in accordance with an embodiment of the invention. Referring to FIG. 7A, there is shown a switch 702 and a sender 704. The switch 702 may correspond to the switch 302 in FIG. 3 and the sender 704 may correspond to a remote terminating device communicating with the switch 702. The switch 702 may comprise a receive window (RCVWND) register 702a. The RCVWND register 702a may comprise suitable logic, circuitry, and/or code that may enable storing current RCVWND values that correspond to the receive TCP window sizes for TCP/IP connections with the switch 702, for example. The sender 704 may comprise a send window (SNDWND) register 704a. The SNDWND register 704a may comprise suitable logic, circuitry, and/or code that may enable storing current SNDWND values that correspond to the send TCP window sizes for TCP/IP connections with the sender 704, for example.

The sender 704 may send a data signal 706 that may comprise, for example, at least one TCP/IP frame that utilizes the send TCP window size stored in the SNDWND register 704a for the connection to the switch 702. The switch 702 may determine based on operations, such as those performed by the classifier 306, the signature engine 310, and/or the MMU 318 in the switch 302, that there is insufficient memory in the free pool of memory to guarantee the current data rate between switch 702 and the sender 704. In this regard, the receive queue in the switch 702 associated with the connection between the switch 702 and the sender 704 may require more memory that may be guaranteed by the switch 702. The switch 702 may determine a target TCP window size and may adjust its receive TCP window size for the connection with the sender 704 by reducing the corresponding RCVWND value to that of the target TCP window size. The reduced RCVWND value associated with the adjusted receive TCP window size may be stored in the RCVWND register 702a, for example. Moreover, the switch 702 may generate a signal 708 to the sender 704 to request that the sender 704 adjusts the send TCP window size that corresponds to the connection with the switch 702.

The sender 704 may acknowledge receiving the request by sending an acknowledgment signal 710 and may adjust its send TCP window size to a requested value. The reduced SNDWND value associated with the adjusted send TCP window size may be stored in the SNDWND register 704a. Subsequent data signals, such as the data signal 712, may comprise least one TCP/IP frame that utilizes the adjusted send TCP window size, thereby reducing the communication data rate between the switch 702 and the sender 704. The switch 702 may continue to monitor the availability of memory from the free pool of memory. When sufficient memory becomes available to guarantee a higher data rate, the switch 702 may adjust its receive TCP window size by increasing the corresponding RCVWND value to that of the original receive TCP window size. The increased RCVWND value may be stored in the RCVWND register 702a. Moreover, the switch 702 may generate a signal 714 to the sender 704 to request that the sender 704 adjusts its send TCP window size.

The sender 704 may acknowledge receiving the request by sending an acknowledgment signal 716 and may adjust its send TCP window size by increasing the SNDWND value to a requested value. The increased SNDWND value may be stored in the SNDWND register 704a. Subsequent data signals, such as the data signal 718, may comprise least one TCP/IP frame that utilizes the adjusted send TCP window size, thereby increasing the communication data rate between the switch 702 and the sender 704.

Figure 7B:
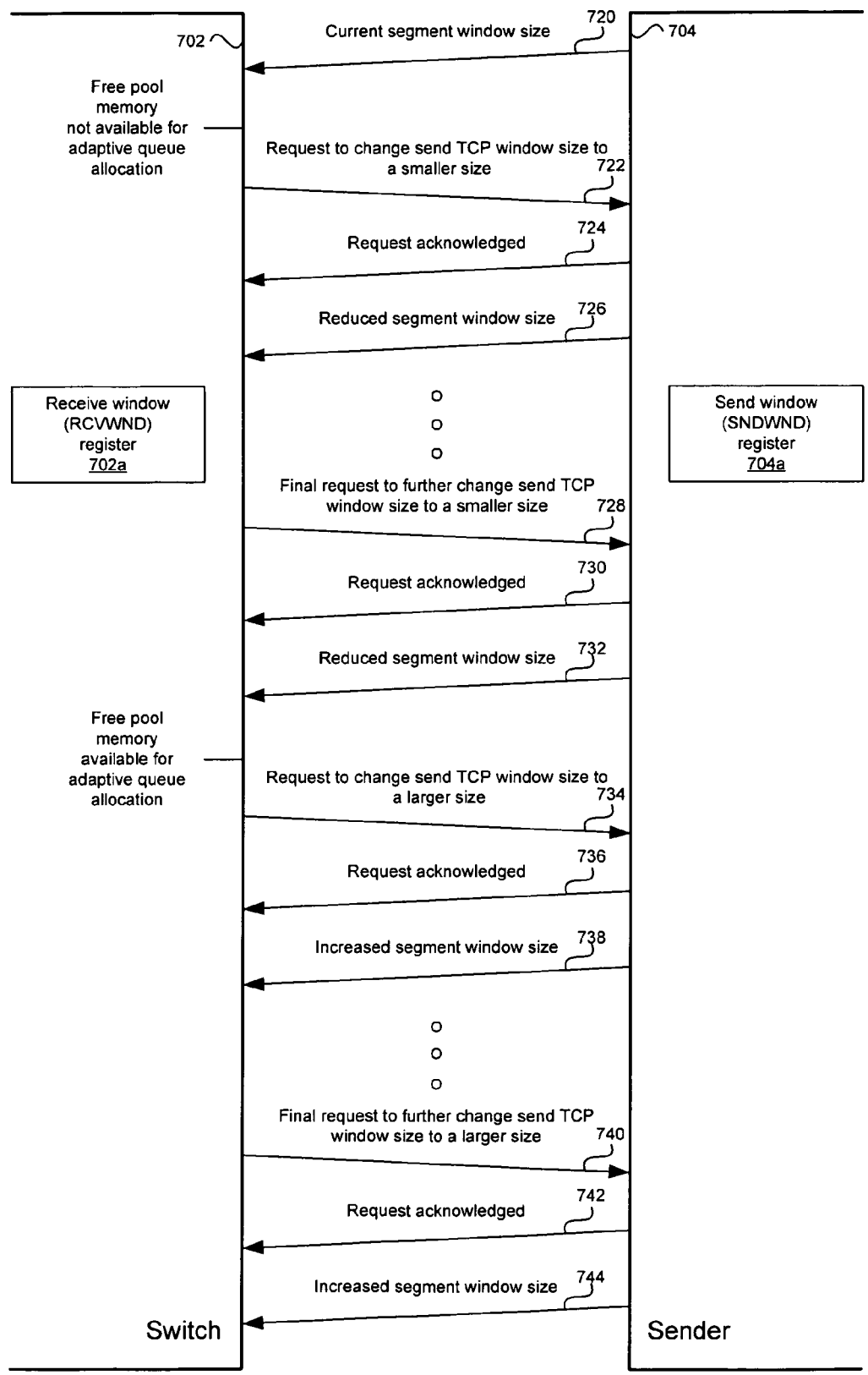
FIG. 7B is a diagram illustrating signaling for window size control as described in FIG. 6, in accordance with an embodiment of the invention.

FIG. 7B is a diagram illustrating signaling for window size control as described in FIG. 6, in accordance with an embodiment of the invention. Referring to FIG. 7B, there is shown the switch 702 and sender 704 as described in FIG. 7A. In this instance, the sender 704 may send a data signal 720 that may comprise, for example, at least one TCP/IP frame that utilizes the send TCP window size stored in the SNDWND register 704a for the connection to the switch 702. The switch 702 may determine based on operations, such as those performed by the classifier 306, the signature engine 310, and/or the MMU 318 in the switch 302, that there is insufficient memory in the free pool of memory to guarantee the current data rate between switch 702 and the sender 704. In this regard, the queue associated with the connection between the switch 702 and the sender 704 may require more memory that may be guaranteed by the switch 702. The switch 702 may determine a target TCP window size and reduction steps and may adjust its receive TCP window size by reducing the corresponding RCVWND value in accordance with the first reduction step. The reduced RCVWND value may be stored in the RCVWND register 702a. Moreover, the switch 702 may generate a signal 722 to the sender 704 to request that the sender 704 adjusts its send TCP window size.

The sender 704 may acknowledge receiving the request by sending an acknowledgment signal 724 and may adjust its send TCP window size to a requested value by changing the corresponding SNDWND value. The reduced SNDWND value may be stored in the SNDWND register 704*a*. Subsequent data signals, such as the data signal 726, may comprise least one TCP/IP frame that utilizes the adjusted send TCP window size, thereby reducing the communication data rate between the switch 702 and the sender 704.

The switch 702 may further reduce the communication rate by utilizing subsequent reduction steps and may adjust its receive TCP window size each time by reducing the RCVWND value in accordance with the corresponding reduction step. Each subsequent RCVWND value that results from the reduction steps may be stored in the RCVWND register 702*a*. Moreover, for each subsequent reduction in the receive TCP window size, the switch 702 may generate signals to the sender 704 to request that the sender 704 adjusts its send TCP window size. The sender 704 may acknowledge each of the subsequent requests and may adjust its send TCP window size by reducing the SNDWND value each time to the requested value. Each subsequent SNDWND value that results from the reduction steps may be stored in the SNDWND register 704*a*.

The switch 702 may perform a final reduction of the receive TCP window size to achieve a target TCP window size by changing the RCVWND value associated with the TCP window size to that of the target TCP window size. The final reduced RCVWND value may be stored in the RCVWND register 702*a*. Moreover, the switch 702 may generate a signal 728 to the sender 704 to request that the sender 704 adjusts its send TCP window size. The sender 704 may acknowledge receiving the final send TCP window size reduction request by sending an acknowledgment signal 730 and may adjust its send TCP window size by changing the SNDWND value to that of the target TCP window size. The final reduced SNDWND value may be stored in the SNDWND register 704*a*. Subsequent data signals, such as the data signal 732, may comprise least one TCP/IP frame that utilizes the adjusted send TCP window size, thereby reducing the communication data rate between the switch 702 and the sender 704.

The switch 702 may continue to monitor the availability of memory from the free pool of memory. When sufficient memory becomes available to guarantee the higher data rate, the switch 702 may adjust its receive TCP window size by increasing the corresponding RCVWND value in accordance with a first increase step. Moreover, the switch 702 may generate a signal 734 to the sender 704 to request that the sender 704 adjusts its send TCP window size.

The sender 704 may acknowledge receiving the request by sending an acknowledgment signal 736 and may adjust its send TCP window size by changing the SNDWND value to the requested value. The increased SNDWND value may be stored in the SNDWND register 704*a*. Subsequent data signals, such as the data signal 738, may comprise least one TCP/IP frame that utilizes the adjusted send TCP window size, thereby increasing the communication data rate between the switch 702 and the sender 704.

The switch 702 may further increase the communication rate by utilizing subsequent increase steps and may adjust its receive TCP window size each time by increasing the RCVWND value in accordance with the corresponding increase step. Each subsequent RCVWND value that results from the increase steps may be stored in the RCVWND register 702*a*. Moreover, for each subsequent increase in the receive TCP window size, the switch 702 may generate signals to the sender 704 to request that the sender 704 adjusts its send TCP window size. The sender 704 may acknowledge each of the subsequent requests and may adjust its send TCP window size by increasing the SNDWND value each time to the requested value. Each subsequent SNDWND value that results from the increase steps may be stored in the SNDWND register 704*a*.

The switch 702 may perform a final increase of the receive TCP window size to achieve the original receive TCP window size, for example, by changing the RCVWND value associated with the TCP window size to that of the original receive TCP window size. The final increased RCVWND value may be stored in the RCVWND register 702*a*. Moreover, the switch 702 may generate a signal 740 to the sender 704 to request that the sender 704 adjusts its send TCP window size. The sender 704 may acknowledge receiving the final send TCP window size increase request by sending an acknowledgment signal 742 and may adjust its send TCP window size by changing the SNDWND value to that of the original receive TCP window size. The final increased SNDWND value may be stored in the SNDWND register 704*a*. Subsequent data signals, such as the data signal 744, may comprise least one TCP/IP frame that utilizes the adjusted send TCP window size, thereby increasing the communication data rate between the switch 702 and the sender 704.

Managing the TCP window size, and therefore the maximum burst size that may be received by a network device, may be useful when the two nodes of a network connection are operating at different interface speeds. For example, a first node, node 1, may be connected to a switch utilizing a 10 Gigabits per second (Gbps) connection and a second node, node 2, may be connected to the switch at 100 Megabits per second (Mbps). The speeds adopted may exceed the buffers that are available even in cases when there is no congestion in the connection. In this regard, the switch may use the knowledge about the speed setting of each ingress and egress port and may actively manage the TCP window size accordingly. In some instances, a message from the switch to any of the end nodes may be interpreted by a TCP offload engine (TOE) in a network interface card (NIC) such as the network interface hardware (NIHW) device 154 described in FIG. 1B, for example.

The active congestion avoidance and TCP window size management operations described in FIGS. 5-7B may be implemented with minimal processing cost to the overall operation of a network switch and may therefore result in an effective approach that may be utilized in network switches for QoS technologies.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing communication data, the method comprising:
performing, by one or more processors and/or circuits within a network switch:
dynamically allocating memory resources from a pool of memory resources to one or more receive buffers, wherein data stored in each of said one or more receive buffers is associated with one or more connections handled by said network switch;
adjusting a size of said one or more receive buffers based on one or both of a threshold and a traffic type associated with said data stored in said one or more receive buffers; and
adjusting one or more TCP window size values associated with said one or more connections based on an amount of memory currently allocated to said one or more receive buffers associated with said one or more connections.

2. The method according to claim 1, comprising reducing said one or more TCP window size values when said memory resources from said pool of memory resources are fully allocated to said one or more receive buffers.

3. The method according to claim 2, comprising reducing said one or more TCP window size values to one or more target TCP window size values utilizing one or more reduction steps.

4. The method according to claim 3, comprising programming said one or more reduction steps.

5. The method according to claim 1, comprising increasing said one or more TCP window size values when a portion of said memory resources from said pool of memory resources is available to be allocated to said one or more receive buffers.

6. The method according to claim 5, comprising increasing said one or more TCP window size values to one or more target TCP window size values utilizing one or more increase steps.

7. The method according to claim 6, comprising programming said one or more increase steps.

8. The method according to claim 1, comprising:
communicating a request for adjustment of said one or more TCP window size values to a remote device associated with said one or more connections to said network switch.

9. A non-transitory machine-readable storage having stored thereon, a computer program having at least one code section for processing communication data, the at least one code section being executable by a machine for causing the machine to perform steps comprising:
dynamically allocating memory resources from a pool of memory resources to one or more receive buffers, wherein data stored in each of said one or more receive buffers is associated with one or more connections handled by a network switch;
adjusting a size of said one or more receive buffers based on one or both of a threshold and a traffic type associated with said data stored in said one or more receive buffers; and
adjusting one or more TCP window size values associated with said one or more connections based on an amount of memory currently allocated to said one or more receive buffers associated with said one or more connections.

10. The non-transitory machine-readable storage according to claim 9, wherein said at least one code section comprises code for reducing said one or more TCP window size values when said memory resources from said pool of memory resources are fully allocated to said one or more receive buffers.

11. The non-transitory machine-readable storage according to claim 10, wherein said at least one code section comprises code for reducing said one or more TCP window size values to one or more target TCP window size values utilizing one or more reduction steps.

12. The non-transitory machine-readable storage according to claim 11, wherein said at least one code section comprises code for programming said one or more reduction steps.

13. The non-transitory machine-readable storage according to claim 9, wherein said at least one code section comprises code for increasing said one or more TCP window size values when a portion of said memory resources from said pool of memory resources is available to be allocated to said one or more receive buffers.

14. The non-transitory machine-readable storage according to claim 13, wherein said at least one code section comprises code for increasing said one or more TCP window size values to one or more target TCP window size values utilizing one or more increase steps.

15. The non-transitory machine-readable storage according to claim 14, wherein said at least one code section comprises code for programming said one or more increase steps.

16. The non-transitory machine-readable storage according to claim 9, wherein said at least one code section comprises code for:
communicating a request for adjustment of said one or more TCP window size values to a remote device associated with said one or more connections to said network switch.

17. A system for processing signals, the system comprising:
one or more processors and/or circuits for use in a network switch, where said one or more processors and/or circuits are operable to:
dynamically allocate memory resources from a pool of memory resources to one or more receive buffers, wherein data stored in each of said one or more receive buffers is associated with one or more connections handled by said network switch;
adjust a size of said one or more receive buffers based on one or both of a threshold and a traffic type associated with said data stored in said one or more receive buffers; and
adjust one or more TCP window size values associated with said one or more connections based on an amount of memory currently allocated to said one or more receive buffers associated with said one or more connections.

18. The system according to claim 17, wherein said one or more processors and/or circuits in said network switch are operable to reduce said one or more TCP window size values when said memory resources from said pool of memory resources are fully allocated to said one or more receive buffers.

19. The system according to claim 18, wherein said one or more processors and/or circuits in said network switch are operable to reduce said one or more TCP window size values to one or more target TCP window size values utilizing one or more reduction steps.

20. The system according to claim 19, wherein said one or more processors and/or circuits in said network switch are operable to program said one or more reduction steps.

21. The system according to claim 17, wherein said one or more processors and/or circuits in said network switch are operable to increase said one or more TCP window size values when a portion of said memory resources from said pool of memory resources is available to be allocated to said one or more receive buffers.

22. The system according to claim 21, wherein said one or more processors and/or circuits in said network switch are operable to increase said one or more TCP window size values to one or more target TCP window size values utilizing one or more increase steps.

23. The system according to claim 22, wherein said one or more processors and/or circuits in said network switch are operable to programmably cause said one or more increase steps.

24. The system according to claim 17, wherein said one or more processors and/or circuits in said network switch are operable to:
  communicate a request for adjustment of said one or more TCP window size values to a remote device associated with said one or more connections to said network switch.

* * * * *